Figure 1:
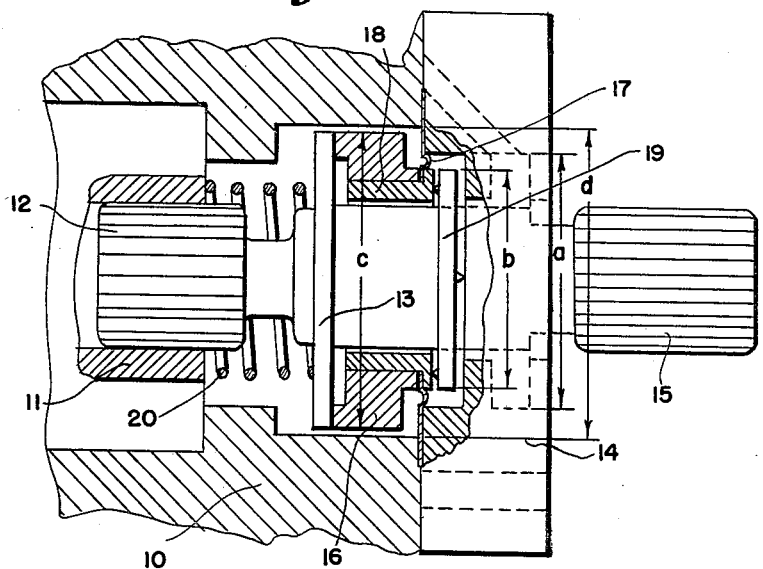

July 18, 1950 E. D. LAAS 2,515,410
SEAL
Filed May 27, 1944

INVENTOR.
EUGENE D. LAAS
BY
AGENT

Patented July 18, 1950

2,515,410

UNITED STATES PATENT OFFICE 2,515,410

SEAL

Eugene D. Laas, New Haven, Conn., assignor, by mesne assignments, to Niles-Bement-Pond Company, West Hartford, Conn., a corporation of New Jersey Application May 27, 1944, Serial No. 537,625

3 Claims. (Cl. 286—11)

This invention relates to rotary pumps and more particularly to pumps of the rotating vane type adapted for supplying liquid fuel or pumping other liquids in connection with aircraft power plants.

A primary object of the invention is to provide a suitable seal between the end of the pump casing and the rotating member for the pump to prevent leakage of the liquid being pumped from the end of the casing through which the pump driving shaft extends.

Another object of the invention is to maintain an effective fluidtight seal during operation of the pump by the pressure within the casing acting in opposite directions on surfaces of different effective area.

A further object is to provide a seal for preventing leakage around a rotating shaft passing thru a wall subject to a fluid pressure differential which varies in direction, in which the fluid pressure differential acts on the seal to maintain the sealing surface in engagement regardless of the direction of the fluid pressure differential.

A feature of importance of the invention is that a ring member supported by a flexible diaphragm within the pump casing near the driving end and maintained against rotation bears against the face of a flange on the driving shaft; the pressure within the pump casing acting on the diaphragm in a direction tending to separate the sealing surfaces being counterbalanced by the pressure acting in the opposite direction on a shoulder of the seal ring attached to the diaphragm.

Another feature of importance is that the shoulder on the seal ring has a materially larger area than the effective area of the diaphragm so that the force tending to separate the sealing surfaces is overbalanced by the force acting against the shoulder on the ring and urging the sealing surfaces into contact.

With the above and other objects in view, the invention includes the features of construction and operation set forth in the following specification and illustrated in the accompanying drawing.

In the accompanying drawing annexed hereto and forming a part of this specification, I have shown the invention embodied in a fuel pump and in a water pump for aircraft power plants, but it will be understood that the invention can be otherwise embodied and that the drawing is not to be construed as defining and limiting the scope of the invention, the claims appended to this specification being relied upon for that purpose.

Figure 2:
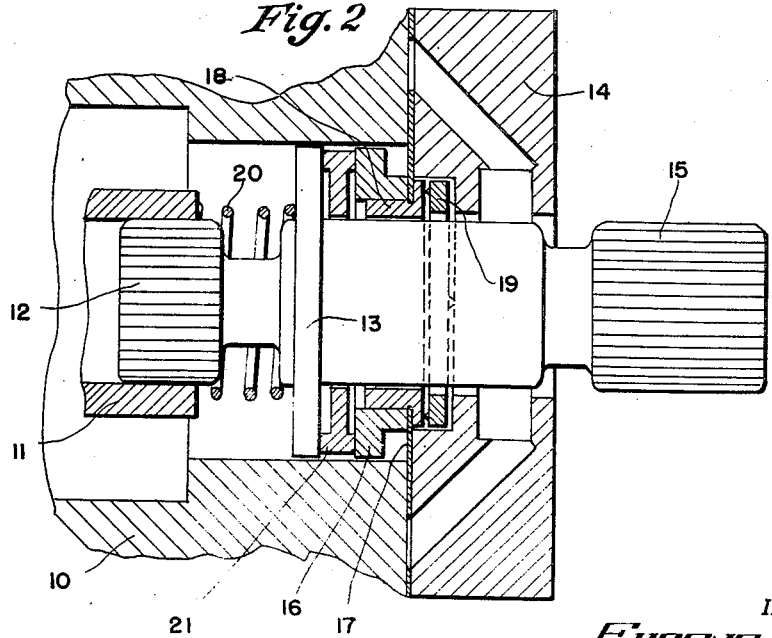

In the drawing:

Figure 1 is a partial longitudinal sectional view taken through the central plane of the pump showing the seal and parts adjacent thereto, and Figure 2 is a similar view showing a modified form of the invention.

In the above-mentioned drawing there have been shown but two embodiments of the invention which are now deemed preferable, but it is to be understood that changes and modifications may be made within the scope of the appended claims without departing from the spirit of the invention.

Briefly, and in its preferred aspect, the invention may include the following principal parts: First, a pump casing; second, a rotating pump member therein; third, a driving shaft flexibly connected to the rotating pump member and extending from the pump casing; fourth, a flange on an intermediate portion of said driving shaft; and fifth, a floatingly but non-rotatably mounted seal ring within the casing hydrostatically forced into a position contacting a surface of the flange.

In the past difficulties have been experienced with standard types of seals for rotating vane pumps when attached to a motor or other driving mechanism for the reason that the pressure within the pump casing gives an endwise force to the shaft, this force acting in a direction to separate the sealing surfaces of the diaphragm supported seal ring and the flange on the driving shaft. This pressure is usually resisted by means of a spring forcing the sealing surfaces into contact. Where the sealing contact between the ring and flange is maintained solely by such a spring, leakage trouble may be encountered when an endwise thrust is applied to the shaft outside the housing. Such a thrust compresses the spring and allows the two sealing surfaces to separate.

The present arrangement overcomes that difficulty by providing a counterbalancing force acting on the floating or stationary seal member which tends to maintain it in engagement with a rotating seal member provided by the flange on the driving shaft. If an endwise force is applied to the shaft, this unbalanced force will cause the flexibly supported seal member to follow the rotary seal member on the shaft and maintain the two surfaces in pressuretight relation. By means of this force acting against the shoulder on the stationary seal member it is unnecessary to rely upon a spring holding the rotating seal member in contact with the face of the stationary seal member during operation of the pump. A spring, however, is shown to maintain the sealing surfaces in contact to prevent leakage of fluid from the pump casing as when the pump casing is not under pressure.

Referring more in detail to the figures of the drawing, I provide a pump casing 10, shown fragmentarily only, in which a rotating member 11, also partially shown only, may be constructed in the usual manner or as indicated in the copending application of Trent H. Holmes and Eugene D. Lass, Serial No. 486,532, filed May 11, 1943, now abandoned. Extending from one end of this rotating member 11 is a drive shaft 12 preferably having a spline connection with one end of the rotating member. This drive shaft 12 extends beyond the pump casing 10 at one side and is provided with an intermediate flange 13 preferably formed integrally thereon. As shown in the figures, the principal portions of this driving shaft 12 are enclosed by a sealing plate 14 beyond which a splined portion 15 of the drive shaft extends for connection to a driving means.

Flexibly supported within the casing 10 adjacent the seal plate 14 is a stationary but floating seal ring 16. This ring is supported by means of a thin, flexible diaphragm 17 clamped at its outer periphery between the end face of the casing 10 and the seal plate 14. As shown in Figure 1, the seal ring 16 has a sleeve 18 pressed within it, there being a small flange at the outer end of sleeve 18 so that the diaphragm 17 may be clamped between abutting surfaces of the ring 16 and sleeve 18. The diameter of the clamping surfaces for the diaphragm 17 is much smaller than the diameter of the sealing surface of the ring 16. This stationary or floating seal ring 16 at its inner end has its face in engagement with one side of the flange 13 on the drive shaft 12 and on its opposite side the flanged end of the sleeve 18 bears against a universal washer 19 at diametrically opposite points. The opposite face of washer 19 has bearing points diametrically opposite each other and at 90° from those on the inner side of the washer. The bearing points on the outer side of this washer bear directly against the inner face of the sealing plate 14. If desired, a light spring 20 may be interposed between the pump rotor 11 and the flange 13 on the drive shaft 12 maintaining the flange 13 in contact with the face of the floating seal ring 16 when the pressures inside and outside the casing are equal.

The seal ring 16 has a disc portion extending substantially parallel to the diaphragm 17 and connecting the part of the seal ring where the diagram 17 is attached with the part on which the sealing surface is formed. It should be noted that the pressure acting on the left side of this disc portion is the pressure outside the casing 10, while the pressure acting on the right side is the pressure inside the casing 10. On the other hand, the pressure acting on the left side of the diaphragm 17 is the pressure inside the casing, while the pressure acting on the right side of the diaphragm is the pressure outside the casing.

When the pressure inside the pump casing is greater than the pressure outside, there is a net force due to this pressure differential acting to the left on the diaphragm assembly, which includes the diaphragm 17, seal ring 16, and sleeve 18. The pressure differential acts to the right on the free diaphragm area between the inner edge of the plate 14 and the central part of the diaphragm where it is clamped between ring 16 and sleeve 18. The area on which the pressure differential acts to the right is therefore the area of an annulus having an outside diameter indicated by dimension $a$ in the drawing and an inside diameter indicated by dimension $b$. At the same time, the pressure differential acts to the left on the disc portion of the seal ring 16. The area on which the pressure differential acts to the left is a second annulus whose outer diameter is indicated at $c$ and whose inner diameter is $b$. Since the inner diameters of both the annuli are the same and the outer diameter of the second annulus is greater than that of the first one, it may be seen that the second annulus has an area greater than that of the first annulus. Therefore, the pressure differential produces a net force acting to the left on the diaphragm assembly and tending to hold the seal ring 16 in engagement with the flange 13. Under these pressure conditions, the difference of pressures acting on the two ends of shaft 12 also acts in a direction to hold the sealing surfaces in contact.

When the pressure inside the casing is less than the pressure outside, the pressure differential causes the diaphragm 13 to separate slightly from the plate 14, thereby increasing the area of the diaphragm subject to the pressure differential. This increased area is an annulus whose inner diameter is shown at $b$ and whose outer diameter is shown at $d$. The force on the diaphragm 17 due to the pressure differential now acts to the left. At the same time, the pressure differential acts toward the right on the disc portion of the seal ring 16 where it acted to the left before. This area was previously identified as the second annulus. The pressure differential acting on the second annulus now acts in a direction tending to separate the sealing surfaces, but it is now opposed by the same pressure differential acting on the larger free area of diaphragm 17, so that the net force due to the pressure differential still acts to hold the sealing surfaces in engagement. Under these pressure conditions, the difference of pressures acting on the ends of the shaft 12 acts in a direction to compress spring 20 and separate the sealing surfaces. Even if it is sufficient to compress the spring 20, however, the forces acting on the diaphragm 17 will cause ring 16 to maintain contact with flange 13.

It may be seen that if an external thrust is applied to the right end of shaft 12, and the thrust is sufficient to overcome the force due to the spring 20 and the pressure differential acting on the projecting area of the drive shaft, then the flange 13 is moved to the left. The pressure differential acting on the diaphragm assembly, however, acts to make the seal ring follow and maintain contact with the shoulder 13, regardless of the movement of that shoulder by the external thrust, and regardless of which pressure is the higher.

Figure 2 shows a modification of the construction shown in Figure 1 which acts to maintain the sealing surfaces in contact in exactly the same manner. In this form of the invention, which is primarily adapted for pumping water, or other fluids, rather than liquid fuel, a carbon or other non-metallic spacing ring 21 is interposed between the side face of the flange 13 on the drive shaft 12 and the end face of the stationary seal ring 16. This carbon spacing ring 21 may ride freely on the driving shaft 12. The purpose of the carbon ring is to enable the pump to be run dry without causing excessive wear at the sealing surfaces and also to eliminate corrosion of some of the parts due to electrolytic effects which occur when surfaces formed of two different metals are in contact with an electrolyte.

The remaining parts of the pump shown in Figure 2 are similar to their corresponding parts in the embodiment of the invention shown in Figure 1. The dimensions have been changed to accommodate the width of the carbon or nonmetallic washer 21. This is accomplished by shortening the seal ring 16 and its sleeve 18. The dimensions have also been changed to reduce the free diaphragm area substantially to zero when the inside of the casing is under pressure higher than the outside pressure.

While I have shown and described certain preferred embodiments of my invention, other modifications thereof will readily occur to those skilled in the art, and I therefore intend my invention to be limited only by the appended claims.

I claim:

1. A seal for a rotating shaft passing through a wall subject to a varying fluid pressure differential between the opposite sides thereof, comprising a seal ring surrounding said shaft and spaced therefrom, flexible diaphragm means attached at its center to said ring and at its edge to said wall to hold said ring against rotation and to permit movement thereof longitudinally with respect to said shaft, said diaphragm means having an area between its center and its edge subject to said pressure differential, a rotating seal element associated with said shaft for rotation therewith and having a surface adjacent said seal ring for sealing contact therewith, said seal ring having a disc portion spaced from said diaphragm, extending parallel thereto and acted on by said pressure differential in a direction opposite to that in which it acts on said diaphragm, and a plate attached to said wall and lying adjacent the side of said diaphragm opposite said disc portion so as to reduce the free area of said diaphragm subject to said pressure differential when said pressure differential moves said diaphragm against said plate, said plate being so proportioned with respect to the areas of said disc and diaphragm as to make said free diaphragm area smaller than the area of said disc when the pressure differential acts on said disc in a direction to move said seal ring into engagement with said seal element, and to make the free diaphragm area greater than the disc area when the pressure differential acts on the disc area in a direction to separate said seal ring from said seal element, so that the net force due to said pressure differential always acts on said seal ring in a direction to hold said surfaces in engagement.

2. Apparatus for sealing the space between a rotatable member and a stationary member thru which said rotatable member passes and which is subject to a pressure differential acting on its opposite sides, comprising a first sealing element rigidly attached to one of said members and having a first sealing surface extending at an angle to said shaft, a second sealing element having a second sealing surface adapted to engage said first surface, a flexible diaphragm connecting said second element with the other of said members, and a plate member adapted to contact and support a portion of the adjacent side of said diaphragm to limit the movement of said portion in one direction only and thereby reduce the effective area of the diaphragm when said pressure differential acts thereon in a direction to separate said sealing surfaces, said diaphragm being adapted when said pressure differential acts in the opposite direction to separate from said plate member and thereby increase the effective area of said diaphragm and the force acting therethru to keep said surfaces in contact.

3. Apparatus for sealing the space between a rotatable member and a stationary member thru which said rotatable member passes and which is subject to a pressure differential acting on its opposite sides, comprising a first sealing element rigidly attached to one of said members and having a first sealing surface extending at an angle to said shaft, a second sealing element having a second sealing surface adapted to engage said first surface, a flexible diaphragm connecting said second element with the other of said members, and a plate member adapted to contact and support a portion of the adjacent side of said diaphragm to limit the movement of said portion in one direction only and thereby reduce the effective area of the diaphragm when said pressure differential acts thereon in a direction to separate said sealing surfaces, said diaphragm being adapted when said pressure differential acts in the opposite direction to separate from said plate member and thereby increase the effective area of said diaphragm and the force acting therethru to keep said surfaces in contact, said second sealing element having a disc portion extending generally parallel to said diaphragm and acted on by said pressure differential in a direction opposite to that in which it acts on said diaphragm, said disc portion having an area greater than the effective area of said diaphragm when said plate member supports said diaphragm portion and less than the effective area of said diaphragm when said diaphragm is separated from said plate member.

EUGENE D. LAAS.

REFERENCES CITED

The following references are of record in the file of this patent:

UNITED STATES PATENTS

| Number | Name | Date |
|---|---|---|
| 1,666,637 | Aldrich et al. | Apr. 17, 1928 |
| 1,746,068 | Barnes | Feb. 4, 1930 |
| 1,768,647 | Warner | July 1, 1930 |
| 1,789,978 | Hull | Jan. 27, 1931 |
| 2,008,580 | Dennison et al. | July 16, 1935 |
| 2,010,930 | Rowe | Aug. 13, 1935 |
| 2,334,548 | Greenlee | Nov. 17, 1943 |
| 2,353,988 | Batesole et al. | July 18, 1944 |
| 2,379,868 | Curtis | July 10, 1945 |